(12) United States Patent
Hwang et al.

(10) Patent No.: US 10,908,638 B2
(45) Date of Patent: Feb. 2, 2021

(54) FOLDING MEMBER AND DISPLAY DEVICE INCLUDING THE SAME

(71) Applicant: Samsung Display Co., LTD., Yongin-si (KR)

(72) Inventors: Seong Jin Hwang, Suwon-si (KR); Sang Hoon Kim, Hwaseong-si (KR); Min Hoon Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/731,481

(22) Filed: Dec. 31, 2019

(65) Prior Publication Data

US 2020/0341508 A1 Oct. 29, 2020

(30) Foreign Application Priority Data

Apr. 29, 2019 (KR) .................. 10-2019-0050077

(51) Int. Cl.
*G06F 1/16* (2006.01)

(52) U.S. Cl.
CPC .......... *G06F 1/1616* (2013.01); *G06F 1/1622* (2013.01); *G06F 1/1641* (2013.01); *G06F 1/1681* (2013.01)

(58) Field of Classification Search
CPC .... G06F 1/1616; G06F 1/1622; G06F 1/1641; G06F 1/1652; G06F 1/1681
USPC .............. 361/679.26, 679.27, 679.3, 679.55, 361/679.56
See application file for complete search history.

(56) References Cited

U.S. PATENT DOCUMENTS

| | | | | |
|---|---|---|---|---|
| 2011/0210937 | A1* | 9/2011 | Kee | G06F 3/041 345/174 |
| 2014/0320396 | A1* | 10/2014 | Modarres | G06F 3/045 345/156 |
| 2015/0220117 | A1* | 8/2015 | Lee | H05K 5/0017 361/749 |
| 2017/0192460 | A1* | 7/2017 | Watanabe | G09F 9/00 |
| 2018/0370207 | A1* | 12/2018 | Nodono | B32B 27/22 |
| 2019/0086962 | A1* | 3/2019 | Shin | G06F 1/1643 |

FOREIGN PATENT DOCUMENTS

| | | |
|---|---|---|
| KR | 1020080019511 A | 3/2008 |
| KR | 1020150043604 A | 4/2015 |
| KR | 1020180049857 A | 5/2018 |

(Continued)

*Primary Examiner* — Anthony Q Edwards
(74) *Attorney, Agent, or Firm* — Cantor Colburn LLP

(57) ABSTRACT

A display device includes a display panel including a folding area and non-folding areas respectively extending from the folding area along a first direction; and a folding member which is foldable together with the display panel, the folding member including: a film layer corresponding to each of the folding area and the non-folding areas of the display panel, the film layer defining a storage space in which a fluid is disposed; and a pair of roller members each in slidable contact with the film layer, each of the pair of roller members slidable along the first direction. Unfolding of the display device moves each of the pair of roller members along the first direction toward the folding area, and folding of the display device moves each of the pair of roller members along the first direction away from the folding area.

20 Claims, 17 Drawing Sheets

(56) References Cited

FOREIGN PATENT DOCUMENTS

| KR | 1020180056444 A | 5/2018 |
|---|---|---|
| KR | 1020180097195 A | 8/2018 |
| KR | 1020180098504 A | 9/2018 |

* cited by examiner

FOLDING MEMBER AND DISPLAY DEVICE INCLUDING THE SAME

This application claims priority to Korean Patent Application No. 10-2019-0050077, filed on Apr. 29, 2019, and all the benefits accruing therefrom under 35 U.S.C. § 119, the disclosure of which is incorporated herein by reference in its entirety.

BACKGROUND

1. Field

The present disclosure relates to a folding member with which components of a display device are folded and a display device including the same.

2. Description of the Related Art

A display device, which is a device for displaying an image, includes a display panel such as an organic light-emitting diode ("OLED") display panel or a liquid crystal display ("LCD") panel.

A mobile electronic device includes a display device to provide an image to a user. The demand for a relatively smaller and thinner mobile electronic device with a relatively larger display screen has increased. A foldable (or bendable) display device capable of being folded and/or unfolded to provide the relatively larger display screen has been developed.

SUMMARY

A foldable (or bendable) display device capable of being folded and/or unfolded to provide the relatively larger display screen has been developed. However, due to tensile and compressive stress applied to a folding area of the foldable display device, a display panel of the foldable display device may be damaged. Various methods have been studied to reduce such stress in the foldable display device.

One or more embodiment of the present disclosure provide a display device having improved durability against folding and unfolding thereof, by using a film layer below a display panel.

It should be noted that objects of the present disclosure are not limited to the above-mentioned object; and other objects of the invention will be apparent to those skilled in the art from the following descriptions.

An embodiment of a display device includes a display panel including a folding area and non-folding areas respectively extending from the folding area along a first direction; and a folding member which is foldable together with the display panel, the folding member including: a film layer corresponding to each of the folding area and the non-folding areas of the display panel, the film layer defining a storage space in which a fluid is disposed; and a pair of roller members each in slidable contact with the film layer, each of the pair of roller members slidable along the first direction. Unfolding of the display device moves each of the pair of roller members along the first direction toward the folding area, and folding of the display device moves each of the pair of roller members along the first direction away from the folding area.

An embodiment of a folding member includes a film layer respectively corresponding to each of a folding area of a display panel and non-folding areas of the display panel which are respectively extended from opposing sides of the folding area along a first direction, the film layer being foldable together with the display panel and defining a storage space in which a fluid is disposed; and a pair of roller members each in slidable contact with the film layer, each of the pair of roller members slidable along the first direction. Unfolding of the display panel moves each of the pair or roller members along the first direction toward the folding area, and folding of the display device moves each of the pair of roller members along the first direction away from the folding area.

According to one or more exemplary embodiment of the invention, a display device having improved durability may be provided by providing a film layer to a lower portion of the display panel for both supporting the display panel in the display device which is unfolded and reducing a stress applied to the display panel in the in the display device which is folded.

Effects of the invention are not restricted to the exemplary embodiments set forth herein and more diverse effects are included in this specification.

BRIEF DESCRIPTION OF THE DRAWINGS

The above and other features of the present disclosure will become more apparent by describing in detail embodiments thereof with reference to the attached drawings, in which.

DETAILED DESCRIPTION

Figure 1:
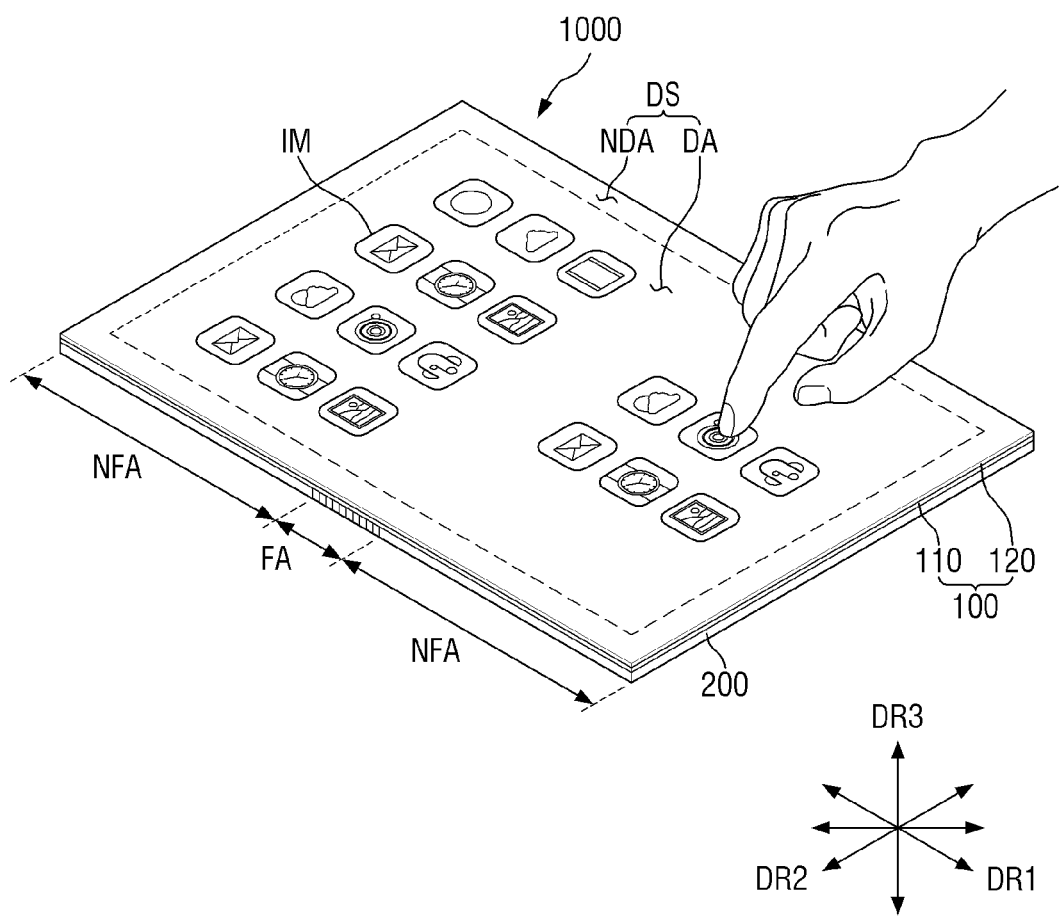
FIG. 1 is a perspective view of an embodiment of a display device.

The invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being related to another element such as being "on" another layer or substrate, it can be directly on the other layer or substrate, or intervening layers may also be present. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims Hereinafter, exemplary embodiments of the present disclosure will be described with reference to the accompanying drawings.

Figure 2:
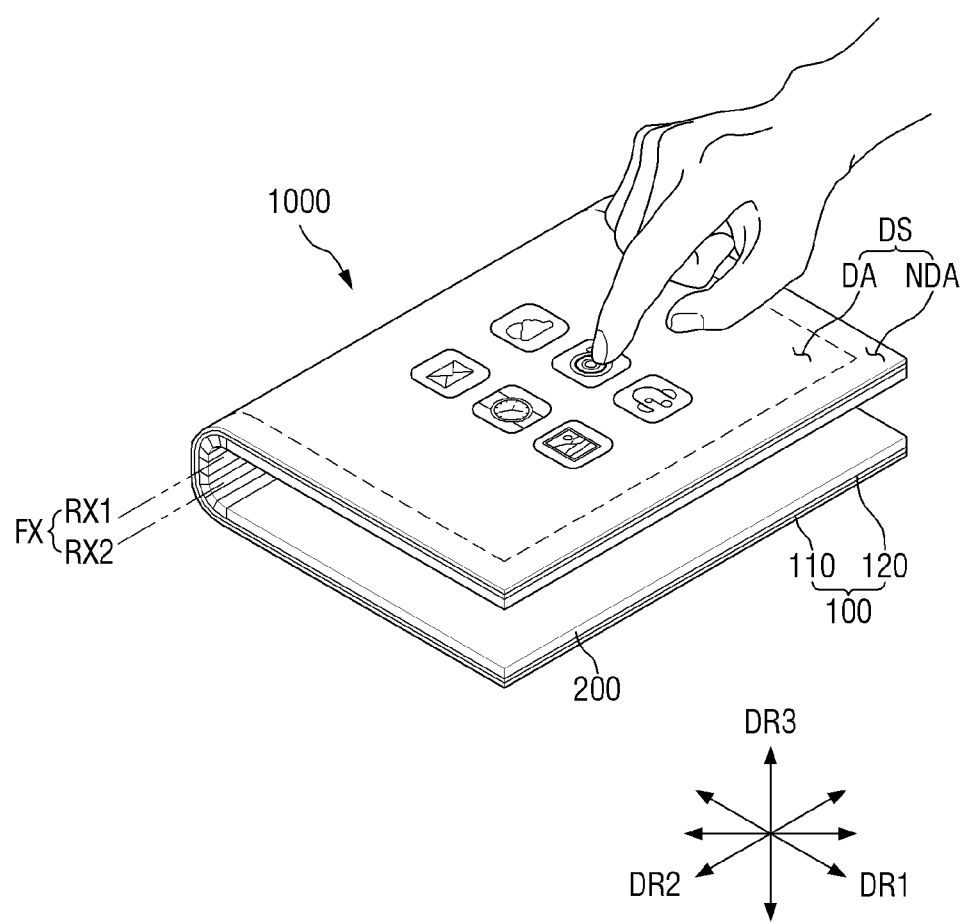
FIG. 2 is a perspective view illustrating and embodiment of the display device of FIG. 1 which is out-folded.

FIG. 1 is a perspective view of an embodiment of a display device 1000. FIG. 2 is a perspective view illustrating an embodiment of the display device 1000 of FIG. 1 which is out-folded.

Referring to FIGS. 1 and 2, a display device 1000 which is disposed flat may have a rectangular shape having a pair of relatively long sides extending along a first direction DR1 and a pair of relatively short sides extending along a second direction DR2 which intersects the first direction DR1, but the present disclosure is not limited thereto. That is, the display device 1000 may have various shapes other than the rectangular shape. The display device 1000 may be a flexible display device that can be folded or unfolded along a folding axis FX which extends along the second direction DR2.

The display device 1000 may be divided into or define a plurality of areas depending on whether the display device 1000 is folded or unfolded. In an embodiment, for example, the display device 1000 which is flat (FIG. 1) may be divided into or define a folding area FA at which the display device 1000 is foldable about the folding axis FX and a non-folding area NFA provided in plural (e.g., non-folding areas NFA) respectively provided at opposing sides of the folding area FA. Each of the non-folding areas NFA may be disposed flat, whether the display device 1000 is disposed flat or is disposed folded about the folding axis FX. Along a length of the display device 1000, the two non-folding areas NFA are arranged along the first direction DR1, and the folding area FA is disposed between the two non-folding areas NFA. In the embodiment of FIGS. 1 and 2, a single folding area FA is defined in the display device 1000, but the present disclosure is not limited thereto. In other embodiments, multiple folding areas FA may be defined in the display device 1000.

In order to provide a double rotational axis to the display device 1000, the folding axis FX may include a first rotational axis RX1 and a second rotational axis RX2 (e.g., first and second rotational axes RX1 and RX2) which each extend along the second direction DR2 and are disposed adjacent to each other. The folding area FA may overlap with or correspond to each of the first and second rotational axes RX1 and RX2, and the display device 1000 may be foldable along each of the first and second rotational axes RX1 and RX2.

The display device 1000 includes a display module 100 and a folding member 200 which is disposed below the display module 100. The top surface of the display module 100 may be defined as a display surface DS and may be disposed in a plane which is defined by the first and second directions DR1 and DR2. An image IM or plural images IM generated by the display module 100 may be provided to outside the display device 1000 via the display surface DS. The display module 100 may be divided into or define a folding area FA and a non-folding area NFA corresponding to those of the display device 1000 described above.

The display surface DS includes a display area DA and a non-display area NDA which is adjacent to the display area DA, such as being on the periphery of the display area DA. The image IM may be displayable at the display area DA, and the image IM may not be displayable at the non-display area NDA. The non-display area NDA may surround the display area DA in a view normal to a plane of the display surface DS to provide edge portions of the display device 1000. The non-display area NDA may be provided as a printed feature having a predetermined color.

The display module 100 has flexibility and includes a display panel 110 and a touch sensing unit 120 (e.g., touch sensor 120) which is disposed on the display panel 110. The display panel 110 generates an image IM and/or emits light, and provides the generated image IM to the display surface DS. The display panel 110 may be any one of a variety of display panels capable of displaying an image IM such as, for example, a liquid crystal display ("LCD") panel, an organic light-emitting diode ("OLED") display panel, an electrophoretic display panel, or an electrowetting display panel. The display panel 110 and the touch sensing unit 120 may be divided into or define a folding area FA and a non-folding area NFA corresponding to those of the display device 1000 and the display module 100 described above.

The touch sensing unit 120 may detect external input or force thereto from an input tool (e.g., a hand of a user or a touch pen), may convert the external input into a predetermined input signal, and may provide the input signal to the display panel 110. The touch sensing unit 120 may include a plurality of touch sensors (not illustrated) with which the external input is detected. The touch sensors may detect the external input in a capacitive manner. The display panel 110 may receive the input signal from the touch sensing unit 120 and may generate an image IM corresponding to the input signal.

The folding member 200 may support the display module 100 and may be rotatable about the first and second rotational axes RX1 and RX2, such that the display device 1000 is foldable about the folding axis FX. The folding member 200 may be foldable together with the display module 100 which has flexibility. Referring to FIG. 2, the folding member 200 may be out-folded together with the display module 100 to dispose the display surface DS of the display module 100 facing outward and exposed to outside the display device 1000, but the present disclosure is not limited thereto. Alternatively, the folding member 200 may in-folded together with the display module 100 to dispose portions of the display surface DS of the display module 100 facing each other.

The structure of the folding member 200 will be described later in detail with reference to FIGS. 7 through 9. A direction that intersects the plane which is parallel to a plane defined by the first and second directions DR1 and DR2 may be defined as a third direction DR3. The third direction DR3 may include an upward direction and a downward direction which is opposite to the upward direction. A thickness of the display device 1000 and/or components thereof may be defined along the third direction DR3.

Figure 3:
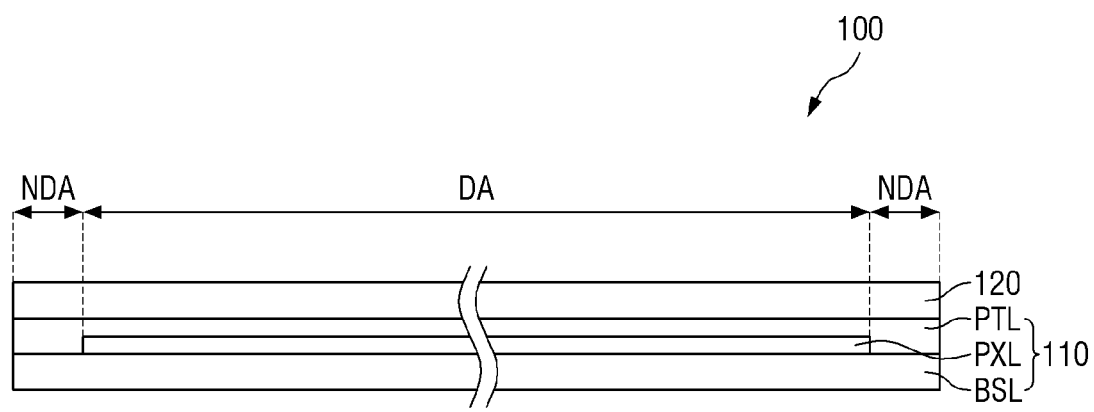
FIG. 3 is a cross-sectional view of an embodiment of a display module of the display device of FIG. 1.
Figure 3:
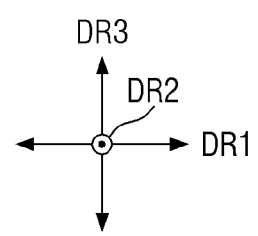

FIG. 3 is a cross-sectional view of an embodiment of the display module 100 of FIG. 1.

Referring to FIG. 3, the display panel 110 includes a base layer BSL, a pixel layer PXL which is disposed on the base layer BSL, and a protective layer PTL which is disposed on the base layer BSL to cover the pixel layer PXL.

The base layer BSL defines the rear surface of the display module 100 and may have flexibility. The pixel layer PXL may include a plurality of pixels (not illustrated) with which an image IM is generated, a light is emitted, etc. The pixel layer PXL may receive electrical signals and may thus be driven to generate the images IM. The protective layer PTL may protect the pixel layer PXL, and the touch sensing unit 120 may be disposed on the protective layer PTL. The protective layer PTL may be provided or formed as a multilayer film and may include an organic insulating film or an inorganic insulating film.

Figure 4:
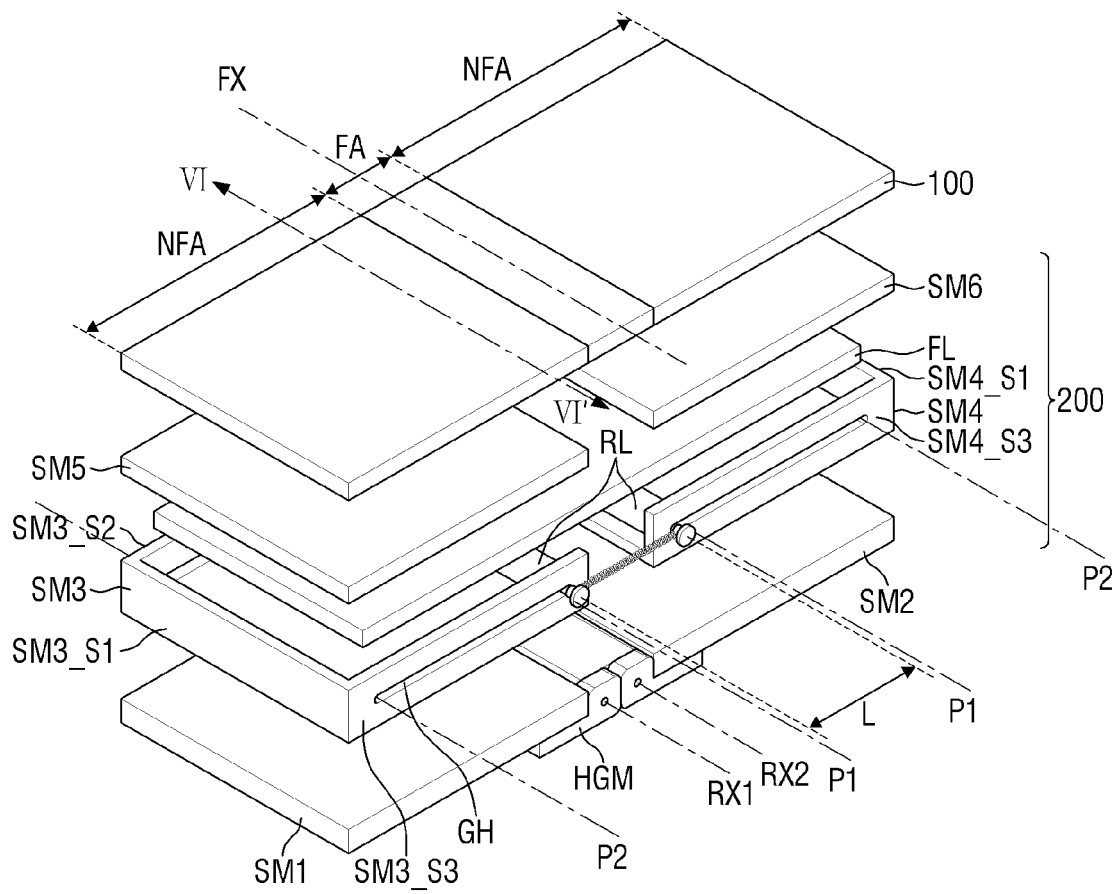
FIG. 4 is an exploded perspective view of an embodiment of the display device of FIG. 1.

FIG. 4 is an exploded perspective view of an embodiment of the display device 1000 of FIG. 1.

Referring to FIG. 4, the folding member 200 includes a first supporting member SM1, a second supporting member SM2, a third supporting member SM3, a fourth supporting member SM4, a fifth supporting member SM5, a sixth supporting member SM6, a hinge member HGM, a roller member RL provided in plural (e.g., roller members RL or a first roller member RL and a second roller member RL), and a film layer FL.

The first and second supporting members SM1 and SM2 may be arranged along the first direction DR1, and the display module 100 is commonly disposed on the first and second supporting members SM1 and SM2 and on the hinge member HGM. The hinge member HGM is disposed between the first and second supporting members SM1 and SM2 to connect first sides of the first and second supporting members SM1 and SM2 that face each other along the first direction DR1, to each other.

The first sides of the first and second supporting members SM1 and SM2 may be disposed to be opposite to each other with respect to the first and second rotational axes RX1 and RX2. The folding area FA of the display module 100 is disposed on the hinge member HGM, and the non-folding areas NFA of the display module 100 are respectively disposed on the top surfaces of the first and second supporting members SM1 and SM2.

The hinge member HGM overlaps with the folding area FA and is disposed between the first and second supporting members SM1 and SM2. The hinge member HGM is connected to the first sides of the first and second supporting members SM1 and SM2 that are opposite to each other along the first direction DR1. The hinge member HGM provides the first and second rotational axes RX1 and RX2 to the first sides of the first and second supporting members SM1 and SM2.

The hinge member HGM may be extended along the second direction DR2 and is disposed between the first and second supporting members SM1 and SM2 facing each other along the first direction DR1. In an embodiment, for example, the first and second supporting members SM1 and SM2 may be connected by a same single hinge member HGM, but the number of hinge members HGM is not particularly limited. In another example, multiple hinge members HGM may be provided.

The third and fourth supporting members SM3 and SM4 are arranged facing each other along the first direction DR1. The third supporting member SM3 is disposed on and corresponding to the first supporting member SM1, and the fourth supporting member SM4 is disposed on and corresponding to the second supporting member SM2.

The third and fourth supporting members SM3 and SM4 may be spaced apart from each other by a distance along the first direction DR1, and such distance may be defined by as much as a dimension (e.g., an entirety of a width) of the folding area FA along the first direction DR1. Although not specifically illustrated, the third and fourth supporting members SM3 and SM4 may be coupled to the first and second supporting members SM1 and SM2, respectively, via fixing members. In an embodiment, for example, the third and fourth supporting members SM3 and SM4 may be coupled to the first and second supporting members SM1 and SM2, respectively, via fixing members such as bolts and nuts or via adhesive layers.

Each of the third and fourth supporting members SM3 and SM4 includes sidewalls (SM3_S1, SM3_S2, and SM3_S3 or SM4 S1, SM4_S2 (not visible in FIG. 4), and SM4_S3) on all the sides thereof except for that adjacent to the folding area FA. Two sidewalls SM3_S2 and SM3_S3 opposing each other along the second direction DR2) of the third supporting member SM3 may each include a guide hole GH (e.g., guide holes GH, a pair of guide holes GH or a pair of first guide holes GH), and two sidewalls SM4_S2 and SM4_S3 opposing each other along the second direction DR2 of the fourth supporting member SM4 may also include a guide hole GH (e.g., a pair of second guide holes GH). That is, the third supporting member SM3 and the fourth supporting member SM4 may each have a pair of the guide holes GH at opposing sides along the second direction DR2. The guide holes GH may penetrate completely through a thickness of the various sidewalls described above.

The roller members RL may be respectively engaged with the third and fourth supporting members SM3 and SM4 to be movable back and forth along the first direction DR1, within the guide holes GH. Specifically, the sidewalls SM3_S2 and SM3_S3 of the third supporting member SM3 and a first one of the roller members RL may be coupled together by a length of the corresponding one of the roller member RL to penetrate each of the sidewalls SM3_S2 and SM3_S3 at the guide holes GH thereof. Similarly, the sidewalls SM4_S2 and SM4_S3 of the fourth supporting member SM4 and a second one of the roller members RL may be coupled together by a length of the corresponding one of the roller member RL to penetrate each of the sidewalls SM4_S2 and SM4_S3 at the guide holes GH thereof. The roller members RL, which are respectively engaged with the third and fourth supporting members SM3 and SM4, may be connected to each other by an elastic member SP provided in plural (e.g., elastic members SP) respectively disposed at opposing sides of the display device 1000. The roller members RL and the elastic members SP will be described later in detail with reference to FIGS. 5 and 6.

The film layer FL is disposed on and corresponding to each of the third and fourth supporting members SM3 and SM4 and the roller members RL. A length of the film layer FL may be extended along the first direction DR1. The film layer FL may include a liquid or gas therein and may include or be formed of a ductile material. The liquid or gas is displaceable within the film layer FL, under a force applied to the film layer FL. The film layer FL may be bendable about a shape of the roller members RL along the first direction DR1. Slidable contact of the roller members RL with the film layer FL may dispose the liquid or gas in the film layer FL flowable in accordance with the movement of the roller members RL such as along the first direction DR1 within the guide holes GH. The film layer FL will be described later in detail with reference to FIGS. 7 through 9.

The fifth and sixth supporting members SM5 and SM6 are arranged along the first direction DR1. The fifth supporting member SM5 is disposed on and corresponding to the third supporting member SM3, and the sixth supporting member SM6 is disposed on and corresponding to the fourth supporting member SM4.

The fifth and sixth supporting members SM5 and SM6 may be spaced apart from each other by a distance along the first direction DR1, and such distance may be defined by as much as a dimension (e.g., an entirety of a width) of the folding area FA along the first direction DR1. Although not specifically illustrated, the fifth and sixth supporting members SM5 and SM6 may be coupled to the third and fourth supporting members SM3 and SM4, respectively, via fixing members. In an embodiment, for example, the fifth and sixth supporting members SM5 and SM6 may be coupled to the third and fourth supporting members SM3 and SM4, respectively, via fixing members such as bolts and nuts or via adhesive layers.

When the fifth and sixth supporting members SM5 and SM6 are coupled to the third and fourth supporting members SM3 and SM4, the top surface of the film layer FL may be in contact with the bottom surfaces of the fifth and sixth supporting members SM5 and SM6, and the bottom surface of the film layer FL may be in contact with the top surfaces of the third and fourth supporting members SM3 and SM4. The film layer FL may be fixed not to move in the first, second, and third directions DR1, DR2, and DR3. Although not specifically illustrated, the third, fourth, fifth, and sixth supporting members SM3, SM4, SM5, and SM6 may further include fixing parts for fixing the film layer FL.

Figure 5:
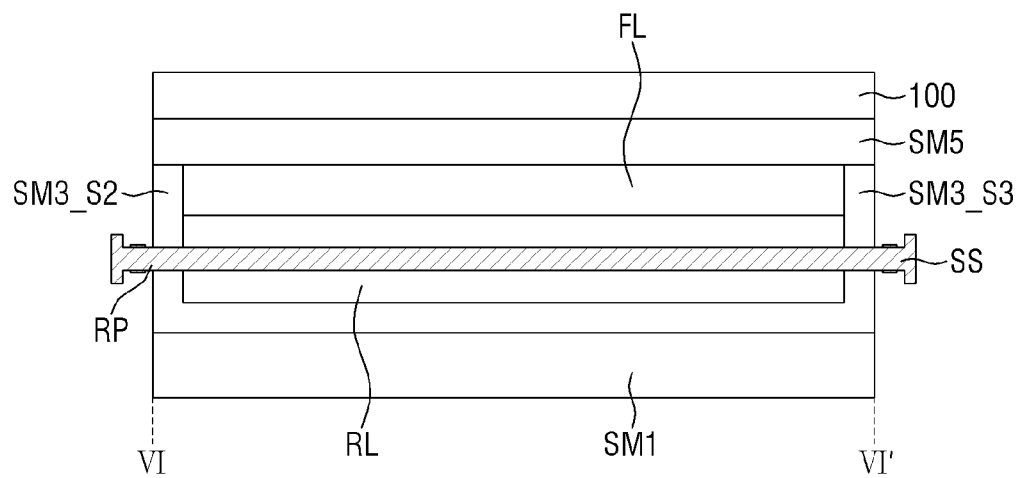
FIG. 5 is a cross-sectional view, taken along line VI-VI' of FIG. 4.
Figure 5:
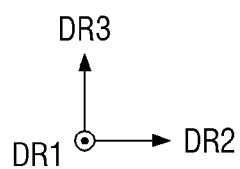
Figure 6:
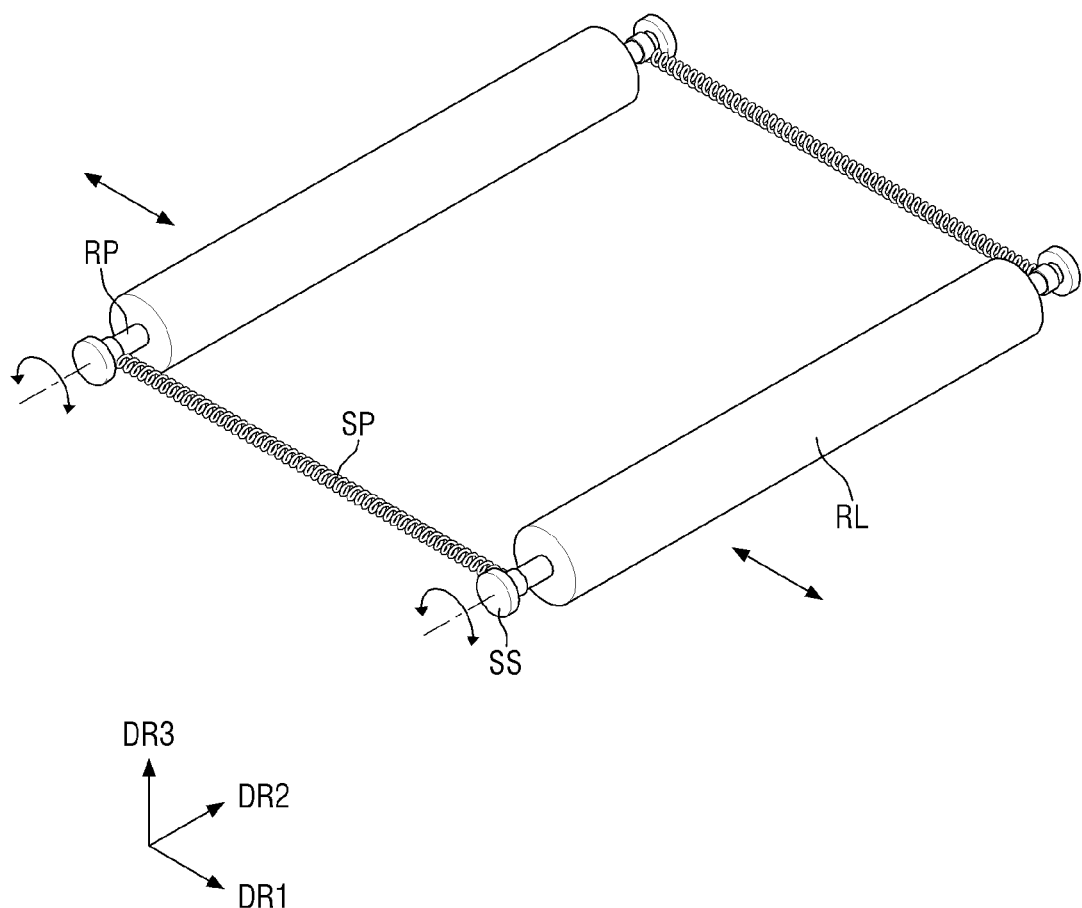
FIG. 6 is a partial perspective view illustrating an embodiment of roller members and elastic members of FIG. 4.

FIG. 5 is a cross-sectional view, taken along line VI-VI' of FIG. 4, and FIG. 6 is a partial perspective view illustrating an embodiment of the roller members RL and the elastic members SP of FIG. 4.

Referring to FIG. 5, along the second direction DR2, the sides of the fifth supporting member SM5 may be aligned with the sides of the third supporting member SM3. Although not shown, the same is provided for the sides of the sixth supporting member SM6 and the fourth supporting member SM4. Although not show, along the first direction DR1, the sides of the fifth and sixth supporting members SM5 and SM6 may be respectively aligned with the sides of the third and fourth supporting members SM3 and SM4.

Referring to FIGS. 4, 5, and 6, elastic supporting parts SS be disposed at opposing ends of a rotary pin RP which protrudes to outside the third supporting member SM3 and the fourth supporting member SM4, at the guide holes GH thereof. The elastic supporting parts SS and the rotary pin RP may be coupled to or engaged with a roller member RL. The rotary pin RP may penetrate the roller member RL to extend further than an end thereof. The elastic members SP are fixed, at both ends thereof, to a pair of the roller members RL rotatably and slidably coupled to the guide holes GH (rotation arrows and sliding arrows indicated in FIG. 6).

Each of the guide holes GH extend rectilinearly along the first direction DR1. Each of the guide holes GH includes a first end P1 which is closest to the folding area FA and a second end P2 which is farthest from the folding area FA. The roller members RL are rotatably coupled to the guide holes GH by the elastic supporting parts SS and the rotary pin RP which penetrate the guide holes GH of the third and fourth supporting members SM3 and SM4. Each one of the rotary pins RP may be inserted into a pair of guide holes GH that are opposite to each other with a sliding gap therebetween and may thus be slidable along the longitudinal direction of the guide holes GH (e.g., along the first direction DR1).

The rotary pins RP may be coupled to the guide holes GH in various manners. Although not specifically illustrated, the rotary pins RP include holding parts spaced apart from the sidewalls defined in the third and fourth supporting members SM3 and SM4 along the second direction DR2. Accordingly, the rotary pins RP can be prevented from deviating and can be rotatably coupled into the sidewalls defined in the third and fourth supporting members SM3 and SM4. The elastic members SP may be implemented as, for example, elastic bands or coil springs, and may be fixed to pairs of rotary pins RP, at respective ends thereof at a same side of the display device 1000. In the example of FIGS. 4 and 6, the elastic members SP are implemented as, for example, coil springs.

Referring to FIG. 4, the display device 1000 which is flat defines a distance L between the first ends P1 at opposing sides of the folding area FA is greater than the initial length of the elastic members SP (e.g., the length of the elastic members SP in the absence of a tensile force). When the display device 1000 is unfolded (e.g., flat), the roller members RL may be located at the first ends P1, which are closest to the folding area FA, and the elastic members SP may be stretched to be disposed at a maximum length. The elastic members SP have an elastic restorative force to reduce a length from the maximum length to be closer to the initial length thereof.

The display device 1000 may be either out-folded such that the display module 100 can be disposed on the outside of the folding member 200, or in-folded such that the display module 100 can be disposed on the inside of the folding member 200.

In an embodiment, the display device 1000 may have a one-way folding structure such the display device 1000 may be either out-foldable or in-foldable, or may have a two-way folding structure such that the display device 1000 can be both out-foldable and in-foldable.

Figure 7:
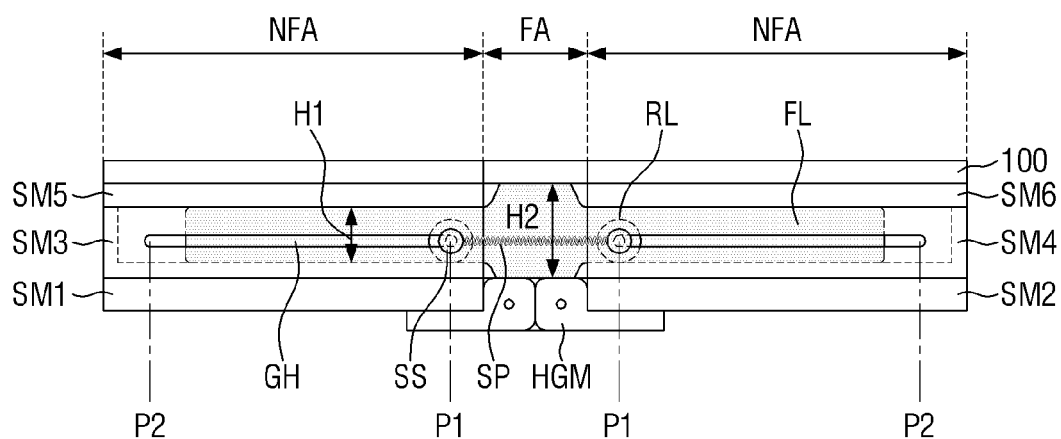
FIG. 7 is a cross-sectional side view of the display device of FIG. 1 which is unfolded.
Figure 7:
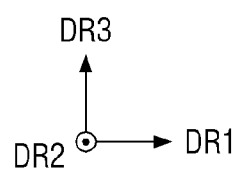
Figure 8:
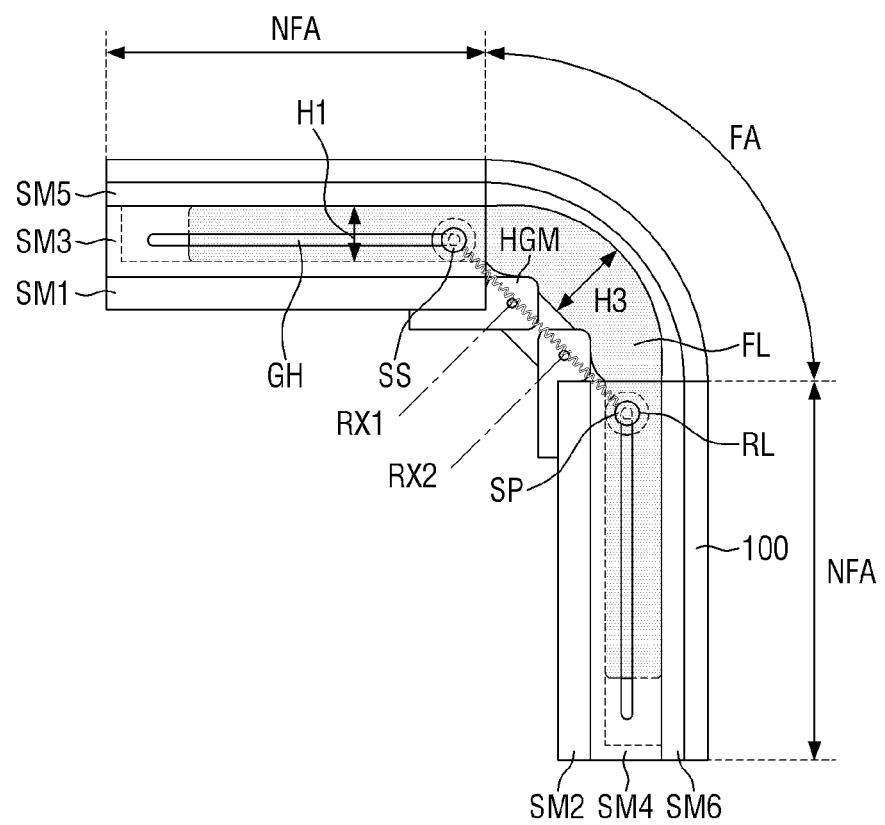
FIG. 8 is a cross-sectional side view of the display device of FIG. 1 which is partially out-folded.
Figure 9:
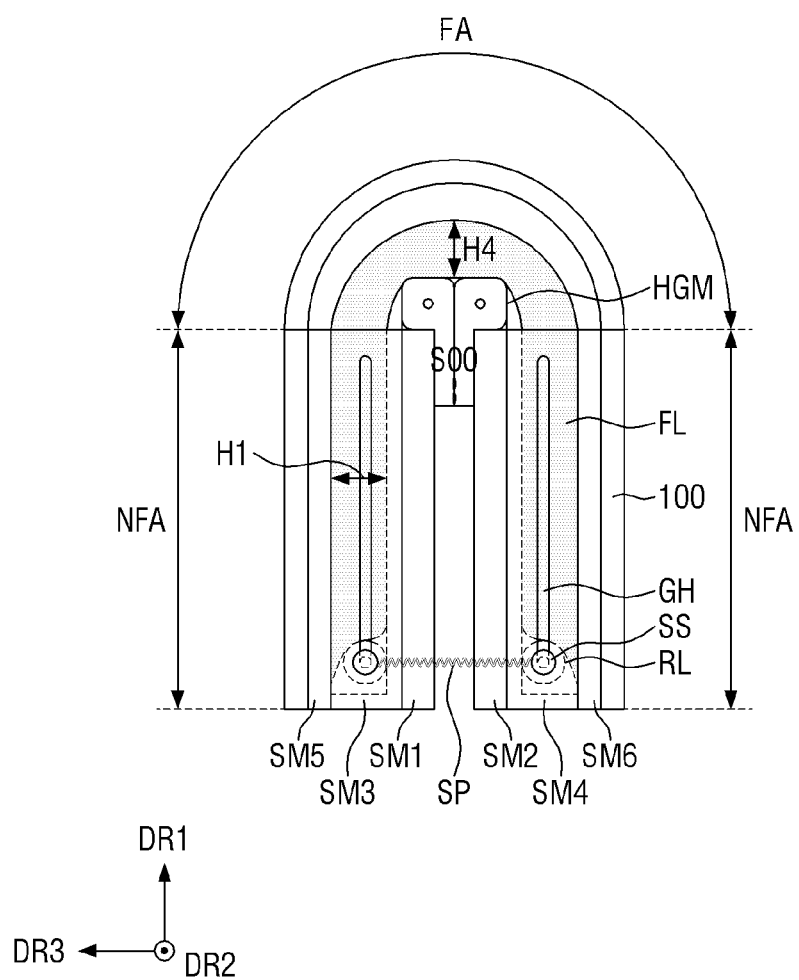
FIG. 9 is a cross-sectional side view of the display device of FIG. 1 which is completely out-folded.

FIG. 7 is a cross-sectional side view of an embodiment of the display device 1000 of FIG. 1 which is unfolded, FIG. 8 is a cross-sectional side view of an embodiment of the display device 1000 of FIG. 1 which is partially out-folded, and FIG. 9 is a cross-sectional side view of another embodiment of the display device 1000 of FIG. 1 which is completely out-folded.

Referring to FIG. 7, the display device 1000 which is unfolded (e.g., flat) disposes the elastic members SP stretched to a maximum length thereof and having an elastic restorative force to shrink a length of the elastic members SP from the maximum length. Thus, the elastic supporting parts SS, which are disposed at the third and fourth supporting members SM3 and SM4, are located at the first ends P1 of the guide holes GH, which are closest to the folding area FA. The roller members RL, which are rotatably coupled by the rotary pins RP of the elastic supporting parts SS to the third and fourth supporting members SM3 and SM4, are also located at the first end P1 of the guide holes GH, which are closest to the folding area FA.

The film layer FL includes or is formed of a ductile material and may thus be deformed by slidable contact of the film layer FL with an outer surface shape (e.g., curvature) of the roller members RL, which are disposed below the film layer FL. As the roller members RL move along the film layer FL, the liquid or the gas in the film layer FL may be displaced within the film layer FL and along the same direction as the roller members RL. Thus, unfolding of the display device 1000 moves the roller members RL toward the folding area FA together with the liquid or the gas in the film layer FL. The display device 1000 which is unfolded disposes the third and fourth supporting members SM3 and SM4 spaced apart from each other by as much as the folding area FA, and disposes the fifth and sixth supporting members SM5 and SM6 spaced apart from each other by as much as the folding area FA. That is, at the folding area FA, there exists an empty space below the display module 100 and between the spaced apart supporting members discussed above.

The display device 1000 which is unfolded, defines a height H2 in the folding area FA, which may be occupied by the liquid or the gas in the film layer FL (e.g., a height H2 of the film layer FL), which is greater than a height H1 of the liquid or the gas in the film layer FL (e.g., a height H1 of the film layer FL) in the non-folding areas NFA. That is, unfolding of the folding member 200 defines a thickness (e.g., height H2) of the film layer FL at the folding area FA which is greater than a remaining thickness (e.g., height H1) of the film layer FL outside of the folding area FA. The liquid or the gas in the film layer FL may move along the third direction DR3 from the folding area FA beyond the gap between the third and fifth supporting members SM3 and SM5 and beyond the gap between the fourth and sixth supporting members SM4 and SM6. The bottom surface of the film layer FL which is closest to the hinge member HGM, may be in contact with the top surface of the hinge member HGM, and the top surface of the film layer FL which is furthest from the hinge member HGM may be in contact with the bottom surface of the display module 100. Accordingly, when the display device 1000 is completely unfolded, the film layer FL can support the display module 100 at the folding area FA and can prevent the display module 100 from wrinkling in the folding area FA.

Referring to FIGS. 8 and 9 in combination with FIG. 7, the display device 1000 which is unfolded shrinks a length of the elastic members SP stretched to a maximum length thereof and having an elastic restorative force. Thus, a force applied to the display device 1000 to fold the display device 1000 together with the elastic restorative force of the elastic members SP act upon the display module 100, and as a result, the display module 100 is folded.

A force applied to the display device 1000 for folding the display device 1000 begins rotation of the first and second supporting members SM1 and SM2 in the folding area FA and about the first and second rotational axes RX1 and RX2, respectively, of the hinge member HGM. Simultaneously (e.g., at the same time), the pair of elastic supporting parts SS slide away from the folding area FA, and the elastic members SP shrink to apply a force which pulls the third and fourth supporting members SM3 and SM4 together with the first and second supporting members SM1 and SM2. The roller members RL, which are rotatably connected by the rotary pins RP of the elastic supporting parts SS, also slide along the guide holes GH away from the folding area FA.

Shrinking of a length of the elastic members SP from a maximum length thereof rotates the rotary pins RP and both ends of each of the elastic members SP also rotate. Referring to FIGS. 8 and 9, relative to an initial position shown in FIG. 7, the rotary pin RP coupled to the first supporting member SM1 rotates clockwise by about 90 degrees, and the rotary pin RP coupled to the second supporting member SM2 rotates counterclockwise by about 90 degrees.

Referring to FIGS. 2 and 9 in combination, the display device 1000 which is folded disposes the first and second supporting members SM1 and SM2 overlapping with each other along a thickness of the display device 1000 (e.g., third direction DR3). The pair of roller members RL are located at the second ends P2, which are farthest from the folding area FA along the first direction DR1. The pair of roller members RL are located at the second ends P2 disposes a length of the elastic members SP parallel to the third direction DR3, which intersects the first and second directions DR1 and DR2.

Referring to FIG. 8, the display device 1000 which is partially folded defines a height H3 in the folding area FA, of the liquid or the gas in the film layer FL (e.g., height H3 of the film layer FL) which may be greater than the height H1 which is the height of the liquid or the gas in the film layer FL in the non-folding areas NFA in the display device 1000 which is unfolded. The height H3 may be smaller than the height H2 in the folding area FA, of the liquid or the gas in the film layer FL in the display device 1000 which is unfolded.

Referring to FIG. 9, the display device 1000 which is completely folded defines a height H4 in the folding area FA, of the liquid or the gas in the film layer FL (e.g., height H4 of the film layer FL). The height H3 of the film layer FL in the display device 1000 which is partially folded may be greater than the height H4 of the film layer FL in the display device 1000 which is completely folded. That is, the folding of the folding member 200 defines a thickness (e.g., H4) of the film layer FL at the folding area FA which is smaller than a remaining thickness of the film layer FL which is outside the folding area FA.

Referring to FIGS. 7 to 9, initial folding of the display device 1000 begins separation of the top surface of the film layer FL from the bottom surface of the display module 100. The initial folding of the display device 1000 both maintains contact of the bottom surface of the film layer FL with the top surface of the hinge member HGM, and separates the top surface of the film layer FL by a predetermined distance from the bottom surface of the display module 100. Accordingly, complete folding of the display device 1000 folds the display module 100 independently from the film layer FL since the display module 100 is separable from the film layer FL. As a result, stress that may be generated in the folding area FA can be reduced in the display device 1000 which is folded.

Figure 10A:
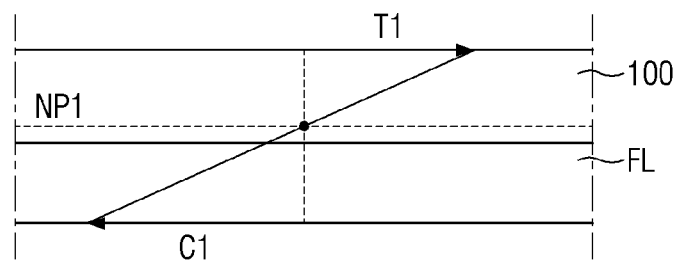
FIGS. 10A and 10B are cross-sectional views of the display device of FIG. 1 for explaining stress applied in folding of the display device of FIG. 1.
Figure 10B:
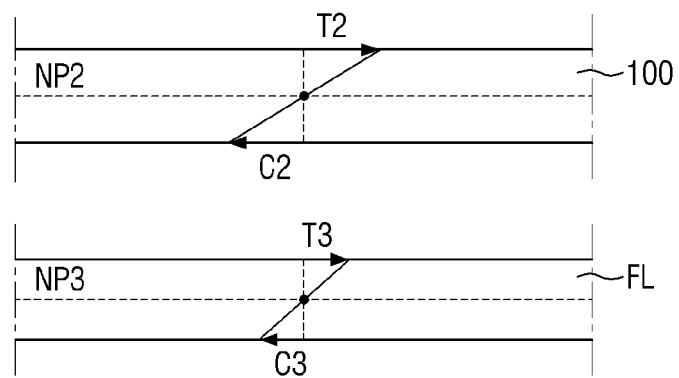

FIGS. 10A and 10B are cross-sectional views of the display device 1000 of FIG. 1 for explaining stress applied in folding of the display device 1000.

Referring to FIGS. 10A and 10B, out-folding of the display device 1000 generates a tensile force is generated above a neutral plane, and generates a compressive force below the neutral plane. Here, the neutral plane refers to a point or surface where stress is zero, or no stress is generated, when a corresponding material is folded.

Specifically, referring to FIG. 10A, when the display module 100 and the film layer FL are disposed to adjoin or in contact with each other, a single first neutral plane NP1 may be formed in the display module 100. A first tensile force T1 may be generated above the first neutral plane NP1, and a first compressive force C1 may be generated below the first neutral plane NP1.

Referring to FIG. 10B, when the display module 100 and the film layer FL are disposed to be apart from each other, a second neutral plane NP2 may be formed in the display module 100, and a third neutral plane NP3 may be formed the film layer FL. A second tensile force T2 may be generated above the second neutral plane NP2, and a second compressive force C2 may be generated below the second neutral plane NP2. Also, a third tensile force T3 may be generated above the third neutral plane NP3, and a third compressive force C3 may be generated below the third neutral plane NP3.

In general, a bending strength of the display device 1000 increases as a thickness of the display device 1000 increases. Thus, the first tensile force T1 may be larger than the second and third tensile forces T2 and T3, and the first compressive force C1 may be larger than the second and third compressive forces C2 and C3. A high resistance to bendability, e.g., poor flexibility of the display device 1000 indicates a relatively strong bending strength.

When the display module 100 and the film layer FL are disposed to be apart from each other, as illustrated in FIG. 10B, the position of the respective neutral planes in the display module 100 or in the film layer FL can be controlled independently. Since the second and third tensile forces T2 and T3, which are smaller than the first tensile force T1, and the second and third compressive forces C2 and C3, which are smaller than the first compressive force C1, the probability of occurrence of cracks in the display device 1000 by folding of the display device 1000 can be reduced.

Figure 11:
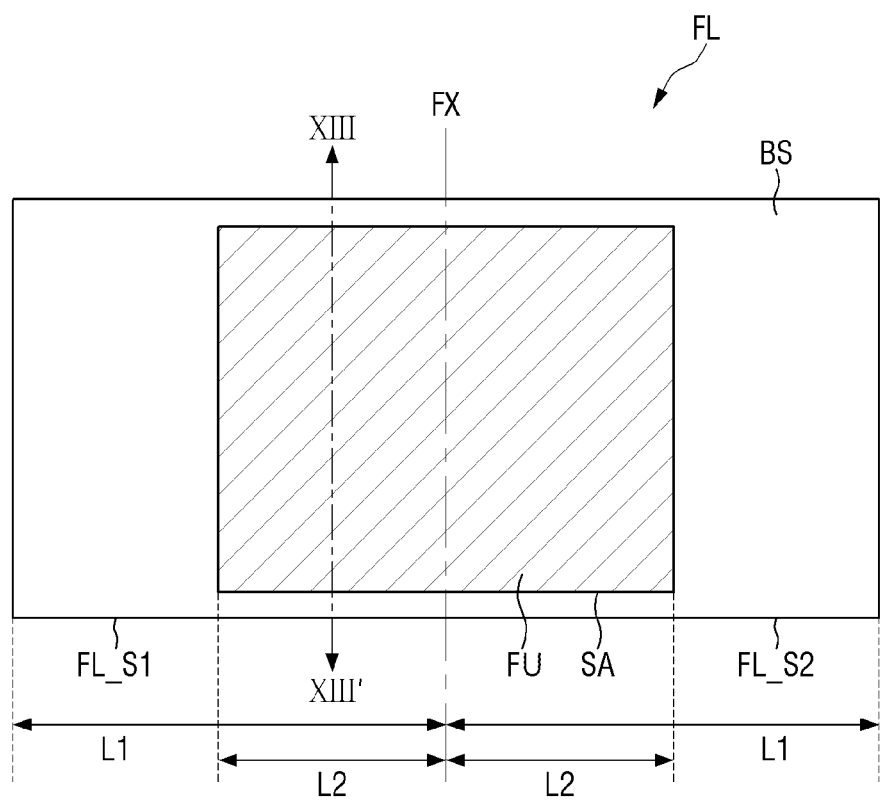
FIG. 11 is a top plan view illustrating an embodiment a film layer.
Figure 11:
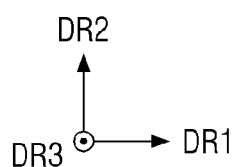
Figure 12:
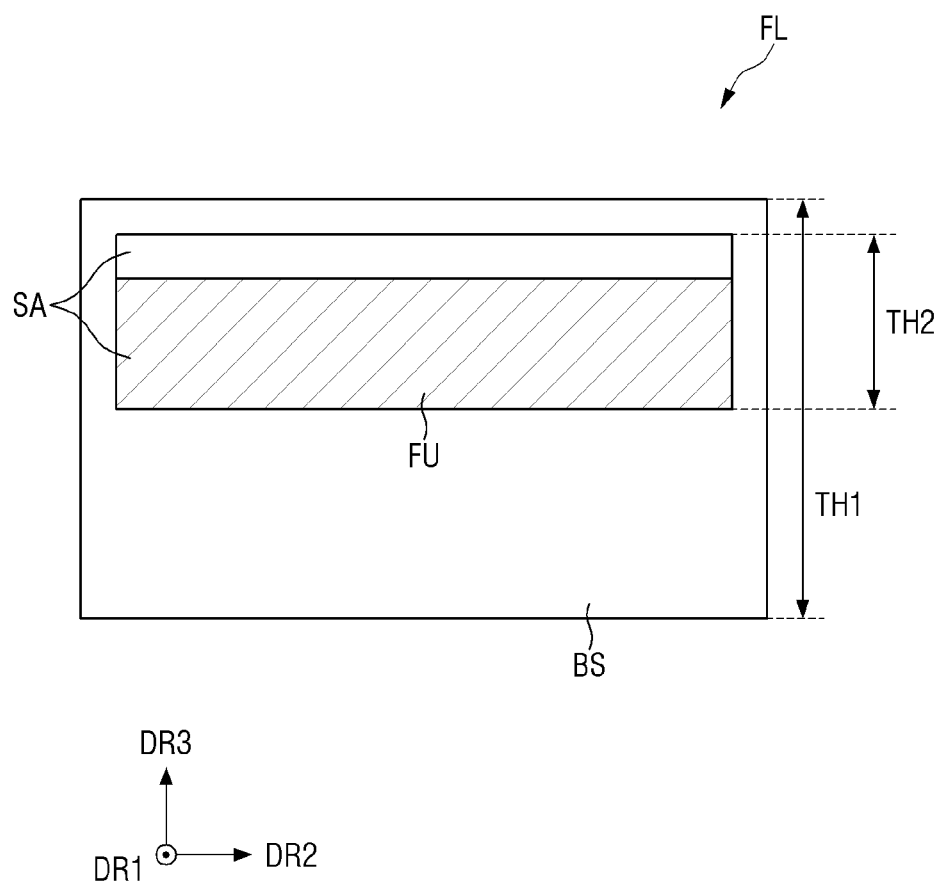
FIG. 12 is a cross-sectional view taken along line XIII-XIII' of FIG. 11.
Figure 13:
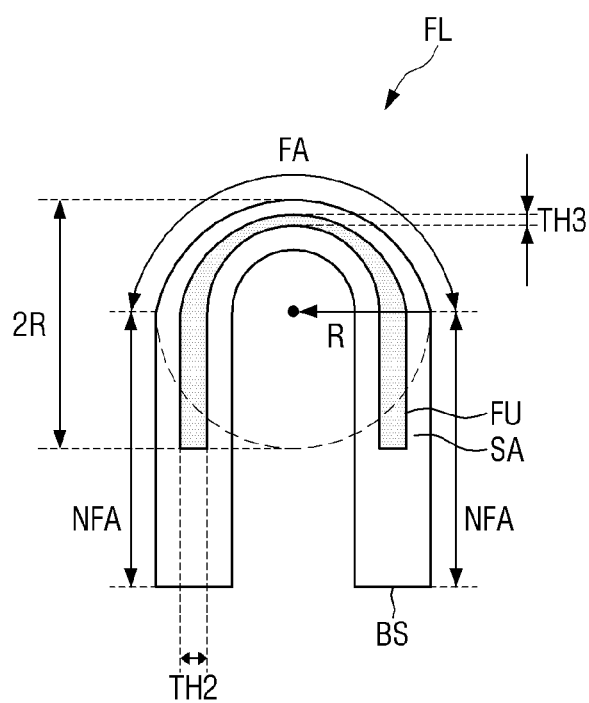
FIG. 13 is a cross-sectional side view illustrating the film layer of FIG. 11.

FIG. 11 is a top plan view illustrating an embodiment of the film layer FL as viewed along the third direction DR3, FIG. 12 is a cross-sectional view taken along line of FIG. 11, and FIG. 13 is a cross-sectional side view illustrating the film layer FL of FIG. 11 which is folded as viewed along the second direction DR2.

Referring to FIGS. 4 and 11 through 13, the film layer FL includes a fluid FU such as a liquid or a gas and a base member BS which includes a storage space SA in which the fluid FU is stored and displaceable.

The base member BS may be symmetrical with respect to a folding axis FX. A length of the base member BS may extend along the first direction DR1, and opposing sides of the base member BS may be disposed at a same distance L1 from the folding axis FX. The base member BS may include at least one material selected from among polyethylene terephthalate ("PET"), polyethylene naphthalate ("PEN"), polyethylene sulfide ("PES"), and polyethylene ("PE"). That is, the base member BS may include or be formed of a polymer material having excellent elasticity. Accordingly, when the roller members RL which are disposed below the base member BS, are moved rectilinearly, the base member BS may be deformed along the curvature of the roller members RL.

A thickness TH1 of the base member BS as a total thickness thereof, may be about 100 micrometers (μm) to about 300 μm. If the thickness of the base member BS is less than 100 μm, the base member BS may be too thin to fully support the bottom of the display module 100, and as a result, the display module 100 may wrinkle in the folding area FA. On the contrary, if the thickness of the base member BS is greater than 300 μm, the base member BS may be too thick to be properly separated from the display module 100 during folding of the display device 1000, and as a result, stress in the display module 100 may not be able to be properly reduced in the folding area FA during folding of the display device 1000.

The base member BS may include the storage space SA, which can store the fluid FU such as a liquid or a gas. In other words, the storage space SA may be an empty space defined by portions of the base member BS. The storage space SA may be symmetrical with respect to the folding axis FX. A length of the storage space SA may extend along the first direction DR1, and opposing sides of the storage space SA may be at a same distance L2 apart from the folding axis FX.

As illustrated in FIG. 13, the display device 1000 which is folded defines a curvature radius R (e.g., radius of curvature R) of the film layer FL. The length L2 of the storage space SA along the first direction DR1 may be proportional to the curvature radius R. In an embodiment, for example, when the curvature radius of the film layer FL is R, the length L2 from the folding axis FX to the storage space SA may be greater than at least 2R. Accordingly, the fluid FU, which fills the storage space SA, can sufficiently flow from the folding area FA to the non-folding areas NFA, and a thickness TH3, in the folding area FA, of the storage space SA may be smaller than a thickness TH2, in the non-folding areas NFA, of the storage space SA. That is, the display device 1000 which is folded reduces the thickness of the film layer FL in the folding area FA, and as a result, the film layer FL previously in contact with the display module 100 in the display device 1000 which is unfolded can be properly separated from the display module 100 in the display device 1000 which is folded.

The thickness TH2 of the storage space SA may account for about 50% to about 75% of the thickness TH1 of the base member BS. In an embodiment, for example, where the length L2 of the storage space SA is smaller than the length L1 of the base member BS, the thickness TH2 of the storage space SA may be relatively large. As the length L2 of the storage space SA increases to approach the length L1 of the base member BS, a thickness of the storage space SA may be reduced.

FIG. 12 illustrates that the storage space SA is not completely filled with the fluid FU such as a liquid or a gas, but the present disclosure is not limited thereto. Alternatively, the storage space SA may be completely filled with the fluid FU. That is, the amount at which the storage space SA is filled with the fluid FU is not particularly limited as long as the base member BS can fully expand in the folding area FA (e.g., have a maximum height such as height H2) due to actuation of the roller members RL, which are disposed below the film layer FL, to properly support the bottom of the display module 100 in the display device 1000 which is unfolded, and can fully shrink in the folding area FA (e.g., have a minimum height such as height H4) due to actuation of the roller members RL to be properly separated from the bottom of the display module 100 in the display device 1000 which is folded.

A liquid having incompressibility may be used as the fluid FU. In an embodiment, for example, water ($H_2O$) may be used as the fluid FU. Also, air may be used as the fluid FU, but the present disclosure is not limited thereto. Alternatively, at least one material selected from, for example, $SiO_2$, $Al_2O_3$, $BaSO_4$, $BiOCl$, $CaCO_3$, $FePO_4$, $Li_2MoO_4$, $MoO_3$, $WO_3$, $Y_2EuO_3$, and ZnO may be used as the fluid FU.

Other embodiments of the present disclosure will hereinafter be described, focusing mainly on the differences with the embodiments of FIGS. 1 through 13.

Figure 14:
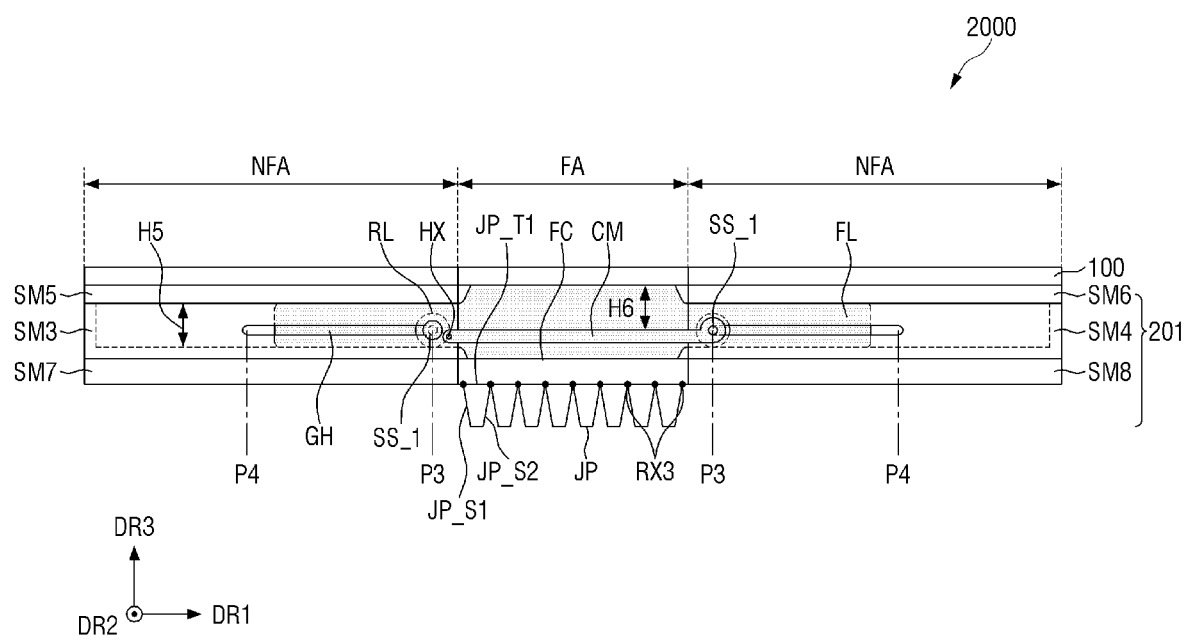
FIG. 14 is a cross-sectional side view of another embodiment of a display device which is unfolded.
Figure 15:
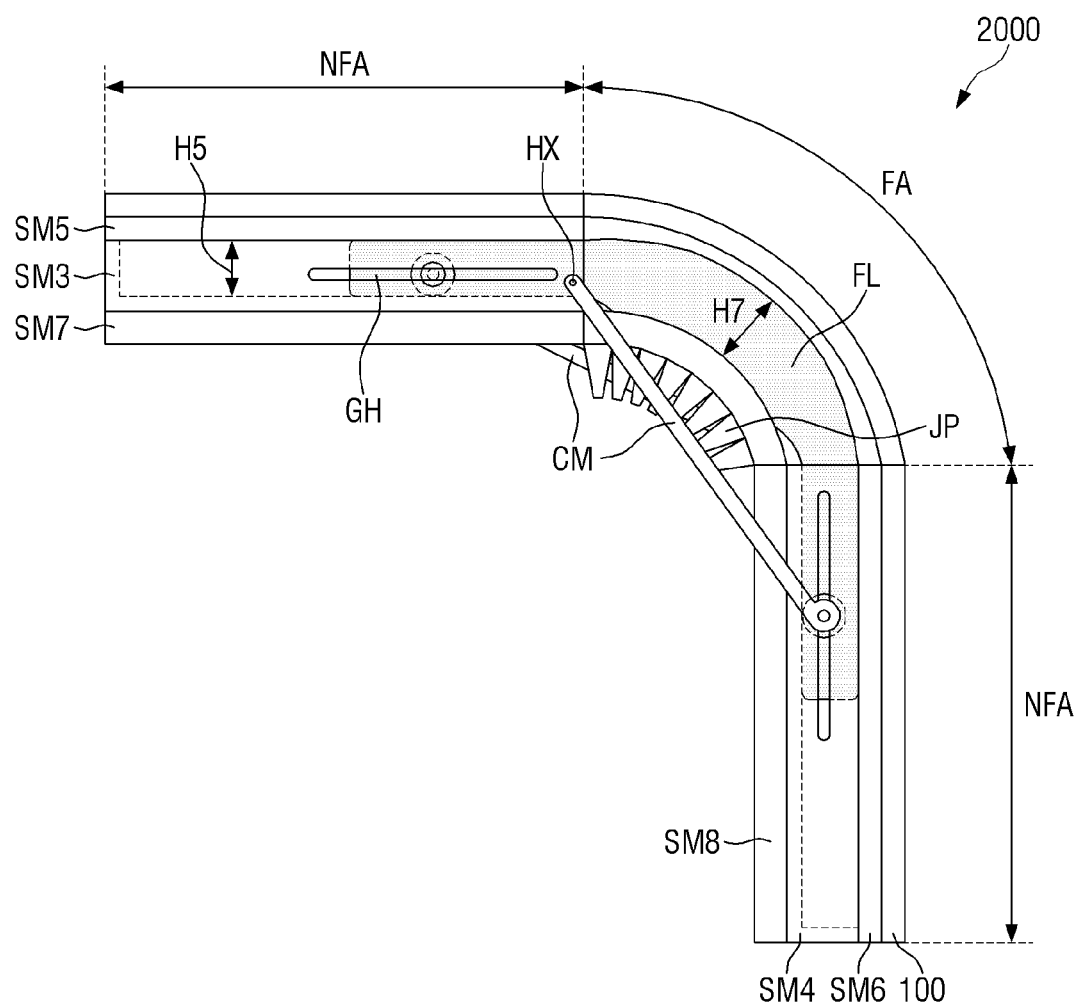
FIG. 15 is a cross-sectional side view of the display device of FIG. 14 which is partially out-folded.
Figure 16:
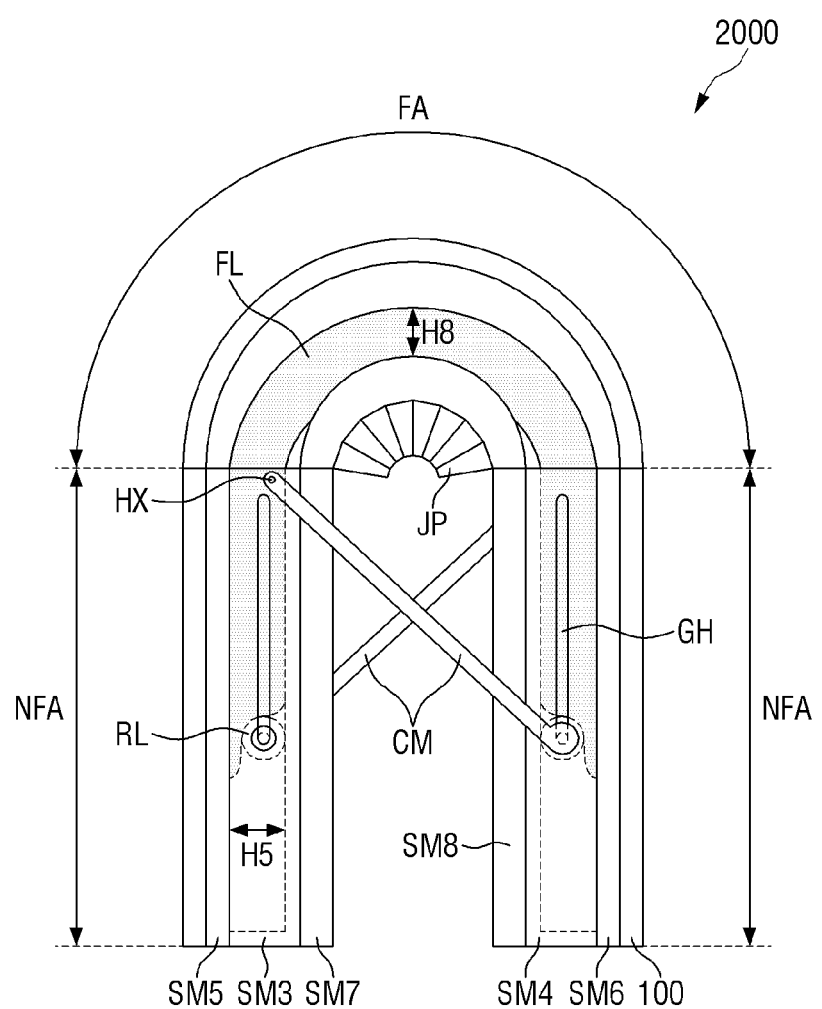
FIG. 16 is a cross-sectional side view of the display device of FIG. 14 which is completely out-folded.

FIG. 14 is a cross-sectional side view of another embodiment of a display device 2000 which is unfolded, FIG. 15 is a cross-sectional side view of the display device 2000 of FIG. 14 which is partially out-folded, and FIG. 16 is a cross-sectional side view of the display device 2000 of FIG. 14 which is completely out-folded.

Referring to FIGS. 14 through 16, a folding member 201 differs from the folding member 200 of FIGS. 7 through 9 in that the display device 2000 includes a seventh supporting member SM7, an eighth supporting member SM8, a shape-adjustable supporting member FC, and a connecting member CM provided in plural (e.g., connecting members CM) at opposing sides of the third and fourth supporting members SM3 and SM4.

Specifically, the folding member 201 includes the seventh supporting member SM7, which is disposed to overlap with or correspond to a third supporting member SM3, the eighth supporting member SM8, which is disposed to overlap with or correspond to a fourth supporting member SM4, and the shape-adjustable supporting member FC, which corresponds to a folding area FA. The bottom surface of the third supporting member SM3 may be attached to the seventh supporting member SM7, and the bottom surface of the fourth supporting member SM4 may be attached to the eighth supporting member SM8.

The shape-adjustable supporting member FC may be implemented as a multi joint member. In an embodiment, for example, the multi joint member may include a joint JP provided in plurality (e.g., a plurality of joint units JP or a plurality of joints JP) which are arranged in succession along a first direction DR1. The joint units JP may be in the shape of rods of which lengths thereof extend along a second direction DR2 which intersects the first direction DR1, and may be in the shape of inverted trapezoids in a cross-sectional view taken along the first direction DR1. The joints JP may be rotatably connected to each other.

Each of the joint units JP may include a supporting surface JP_T1 (e.g., supporting surfaces JP_T1) which faces the folding area FA and two inclined surfaces JP_S1 and JP_S2 which are disposed at the rear of the supporting surface JP_T1. Each individual one of the joint units JP may rotatable about two third rotational axes RX3 which are disposed at the supporting surface JP_T1 and may be rotatably coupled to neighboring joint units JP with one of the third rotational axes RX3 interposed therebetween.

In an embodiment, for example, the seventh supporting member SM7, the joint units JP, and the eighth supporting member SM8 may be hinge-coupled via multiple hinge axes, in which case, the hinge axes may serve as the third rotational axes RX3. Unfolding of a display device 2000 may dispose the supporting surfaces JP_T1 of the joint units JP parallel to one another and may also be parallel to the seventh and eighth supporting members SM7 and SM8.

The shape-adjustable supporting member FC is not particularly limited to being a multi joint member, and any type of element capable of being disposed flat and bent may be used as the shape-adjustable supporting member FC. The shape-adjustable supporting member FC which is flat disposes the display device 2000 unfolded, and the shape-adjustable supporting member FC which is bent disposes the display device 2000 folded.

In the folding area FA, the bottom surface of a film layer FL may be or may not be attached to (e.g., may be separable from) the shape-adjustable supporting member FC. Where the bottom surface of the film layer FL is not attached to the shape-adjustable supporting member FC, the bottom surface of the film layer FL may remain in contact with, or be disposed slightly apart from, the top surface of the shape-adjustable supporting member FC, either of which reduces stress applied to the folding area FA by folding of the display device 2000.

The second sidewall SM3_S2 of the third supporting member SM3 is provided at a same first side of the display device 2000 as the second sidewall SM4_S2 (not visible in FIG. 4) of the fourth supporting member SM4. The third sidewall SM3_S3 and the third sidewall SM4_S3 are disposed at a same second side of the display device 2000 which is opposite to the first side thereof. In an embodiment, at a same side of the display device 2000, a pair of two connecting members CM may each be connected to both the third and fourth supporting members SM3 and SM4. In an embodiment, at the same side of the display device 2000, one of the pair of two connecting members CM (e.g., a first connecting member CM and a second connecting member CM) may be disposed at an inner side of the sidewalls and the other of the pair of the connecting members CM may be disposed at an outer side of the sidewalls. That is, the display device 2000 may include a total of four of the connecting members CM, but the invention is not limited thereto.

For a pair of two connecting members CM illustrated in FIGS. 14 to 16, disposed at a same side of the display device 2000, a first end of a first one of the connecting member CM is rotatably connected to the third supporting member SM3 at a hinge axis HX which is provided or formed adjacent to the fourth supporting member SM4 along the first direction DR1, and a second end of the first one of the connecting member CM which is opposite to the first end, is slidably connected to the fourth supporting member SM4 at a guide hole GH thereof described above. A first end of a second one of the connecting member CM is rotatably connected to the fourth supporting member SM4 at a hinge axis HX which is provided or formed adjacent to the third supporting member SM3 along the first direction DR1, and a second end of the second one of the connecting member CM which is opposite to the first end, is slidably connected to the third supporting member SM3 at a guide hole GH thereof described above.

That is, in an embodiment of a pair of two connecting members CM disposed at a same side of the display device 2000, the first ends of the pair of the connecting members CM are rotatably connected to the third supporting member SM3 and the fourth supporting member SM4 the hinge axes HX thereof, and the second ends of the connecting members CM are slidably connected to elastic supporting parts SS_1 which penetrate the guide holes GH of the fourth supporting member SM4 and the third supporting member SM3, respectively.

A pair of roller members RL are rotatably coupled by elastic supporting parts SS_1 which penetrate the guide holes GH provided in a pair of opposite sidewalls SM3_S2 and SM3_S3 of the third supporting member SM3 and a pair of opposite sidewalls SM4_S2 and SM4_S3 of the fourth supporting member SM4. The elastic supporting parts SS_1 may slide along the longitudinal direction of pairs of guide holes GH that are disposed with a sliding margin therebetween by being inserted in the guide holes GH. In an embodiment, the pair of two connecting members CM disposed at a same side of the display device 2000 may be respectively connected to same ends of the pair of roller members RL. The structure in FIGS. 14 to 16, for example, may represent a structure at a same first end of the pair of roller members RL or a same second end of the pair of roller members RL.

Referring to FIG. 14, the display device 2000 which is unfolded disposes the second ends of the connecting members CM at third ends P3 of the guide holes GH. The display device 2000 which is completely unfolded may dispose the second ends of the connecting members CM together with that the roller members RL at third ends P3 of the guide holes GH, to be disposed at opposing sides of the folding area FA. The film layer FL provided or formed of a ductile material may thus be deformed along the curvature of the roller members RL, which are disposed below the film layer FL, and the liquid or the gas in the film layer FL may move in the same moving direction as the roller members RL.

Therefore, unfolding of the display device 2000 moves the liquid or the gas in the film layer FL toward the folding area FA since the roller members RL slidably move along the guide holes GH toward the folding area FA. The display device 2000 which is unfolded disposes the third and fourth supporting members SM3 and SM4 apart from each other by as much as the folding area FA, and disposes the fifth and sixth supporting members SM5 and SM6 also apart from each other by as much as the folding area FA. That is, in the folding area FA, an empty space is defined below a display module 100, where the empty space includes a separation area between the third and fourth supporting members SM3 and SM4 apart from each other together with a separation area between the fifth and sixth supporting members SM5 and SM6 apart from each other.

Referring to FIG. 14, the display device 2000 which is unfolded defines a height H6 in the folding area FA, of the liquid or the gas in the film layer FL which may be greater than a height H5, in non-folding areas NFA, of the liquid or the gas in the film layer FL. The liquid or the gas in the film layer FL may move along the third direction DR3 from the folding area FA, beyond the gap between the third and fourth supporting members SM3 and SM5 and beyond the gap between the fourth and sixth supporting members SM4 and SM6. The bottom surface of the film layer FL may be in contact with the top surface of the shape-adjustable supporting member FC, and the top surface of the film layer FL may be in contact with the bottom surface of the display module 100. Accordingly, the display device 2000 which is completely unfolded disposes the film layer FL contacting both the shape-adjustable supporting member FC and the film layer FL to support the display module 100 at the folding area FA and can reduce or effectively prevent wrinkling of the display module 100 in the folding area FA.

Referring to FIGS. 15 and 16, the display device 2000 which is in unfolded disposes the second ends of the connecting members CM at the third ends P3 of the guide holes GH. If a force is applied to the display device 2000 to fold the display device 2000, the force applied acts upon the display module 100, and as a result, the display module 100 begins to be bent. As a result, the second ends of the connecting members CM may begin to slide along the guide holes GH. The display device 2000 which is completely folded disposes the second ends of the connecting members CM at fourth ends P4 of the guide holes GH.

Specifically, if a force is applied to the display device 2000 to fold the display device 2000, the shape-adjustable supporting member FC begins to be bent in the folding area FA. Simultaneously, a pair of elastic supporting parts SS_1 slide away from the folding area FA, and the roller members RL which are rotatably connected by the elastic supporting parts SS_1, also slide away from the folding area FA.

The display device 2000 which is partially folded defines a height H7, in the folding area FA, of the liquid or the gas in the film layer FL which may be greater than the height H5, which is the height, in the non-folding areas NFA, of the liquid or the gas in the film layer FL in the display device 2000 which is unfolded. The height H7 may be smaller than the height H6, which is the height, in the folding area FA, of the liquid or the gas in the film layer FL in the display device 1000 which is unfolded, and may be greater than the height H8, which is the height, in the folding area FA, of the liquid or the gas in the film layer FL in the display device 2000 which is completely folded. That is, as the display device 2000 begins to be folded, the top surface of the film layer FL may be separated from the bottom surface of the display module 100. That is, the bottom surface of the film layer FL may still be in contact with the top surface of the shape-adjustable supporting member FC, and the top surface of the film layer FL may be a predetermined distance apart from the bottom surface of the display module 100. Accordingly, folding of the display device 2000 separates the film layer FL from the display module 100 and folds the display module 100 independent from the film layer FL. As a result, stress that may be generated in the folding area FA can be reduced.

In concluding the detailed description, those skilled in the art will appreciate that many variations and modifications can be made to the embodiments without substantially departing from the principles of the invention. Therefore, the disclosed embodiments of the invention are used in a generic and descriptive sense only and not for purposes of limitation.

What is claimed is:

1. A display device comprising:
    a display panel including a folding area at which the display panel is foldable and non-folding areas respectively extending from opposing sides of the folding area along a first direction; and
    a folding member which supports a bottom surface of the display panel and is foldable together with the display panel, the folding member including:
        a film layer corresponding to each of the folding area and the non-folding areas of the display panel, the film layer defining a storage space in which a fluid is disposed; and
        a pair of roller members each in slidable contact with the film layer, each of the pair of roller members slidable along the first direction,
    wherein
    unfolding of the display device moves each of the pair of roller members along the first direction toward the folding area, and
    folding of the display device moves each of the pair of roller members along the first direction away from the folding area.

2. The display device of claim 1, wherein moving of each of the pair of roller members along the first direction moves the fluid within the storage space along the first direction.

3. The display device of claim 1, wherein the display device which is unfolded disposes a top surface of the film layer in contact with the bottom surface of the display panel in the folding area.

4. The display device of claim 1, wherein the display device which is folded disposes a top surface of the film layer spaced apart from the bottom surface of the display panel in the folding area.

5. The display device of claim 1, wherein
    the display device which is folded defines a radius of curvature of the folding area,
    the display device which is unfolded defines a length of the storage space, and
    along the first direction, the length of the storage space is proportional to the radius of curvature of the folding area.

6. The display device of claim 1, wherein the folding member further comprises:
    first and second supporting members respectively corresponding to the non-folding areas of the display panel and separated from each other at the folding area of the display panel, and
    a hinge member which corresponds to the folding area of the display panel and is foldable together with the display panel, the hinge member including:
        a first side rotatably connected to the first supporting member about a first rotational axis, and
        a second side rotatably connected to the second supporting member about a second rotational axis,
    wherein the hinge member which is folded supports the film layer in the folding area of the display panel.

7. The display device of claim 6, wherein the folding member further comprises third and fourth supporting members respectively corresponding to the first and second supporting members and separated from each other at the folding area of the display panel,
    wherein
    the third supporting member includes a pair of first guide holes respectively disposed in opposing sides of the third supporting member and each extended along the first direction, and
    the fourth supporting member includes a pair of second guide holes respectively disposed in opposing sides of the fourth supporting member and each extended along the first direction, and
    wherein the pair of roller members includes:
        a first roller member slidably and rotatably coupled to the first guide holes of the third supporting member, and
        a second roller member slidably and rotatably coupled to the second guide holes of the fourth supporting member,
    wherein at each of two opposing sides of the display device, the first and second roller members are coupled to each other by an elastic member.

8. The display device of claim 7, wherein
    each of the first guide holes includes a first end which is closest to the folding area and a second end which is farthest from the folding area,
    each of the second guide holes includes a first end which is closest to the folding area and a second end which is farthest from the folding area, and
    the display device which is unfolded disposes:
        the pair of roller members at the first ends of the first guide holes and the first ends of the second guide holes, and
        the elastic members at a maximum length.

9. The display device of claim 8, wherein
    folding of the display device which is unfolded, slides and rotates the pair of roller members at the same time toward the second ends of the first guide holes and the second ends of the second guide holes, and
    sliding and rotation of the pair of roller members toward the second ends of the first guide holes and the second ends of the second guide holes, reduces a length of the elastic members from the maximum length, wherein the length of the elastic members which is reduced pulls the first and second supporting members toward each other.

10. The display device of claim 1, wherein the folding member further comprises:
    first and second supporting members respectively corresponding to the non-folding areas of the display panel and separated from each other at the folding area of the display panel, and
    a shape-adjustable supporting member which corresponds to the folding area of the display panel and is foldable together with the display panel, the shape-adjustable supporting member including:
        a first side rotatably connected to the first supporting member, and a second side rotatably connected to the second supporting member,
wherein the shape-adjustable supporting member which is folded supports the film layer in the folding area of the display panel.

11. The display device of claim 1, wherein the folding member further comprises:
third and fourth supporting members respectively corresponding to the non-folding areas of the display panel and separated from each other at the folding area of the display panel,
the third supporting member including a pair of first guide holes respectively disposed in opposing sides of the third supporting member and each extended along the first direction,
the fourth supporting member including a pair of second guide holes respectively disposed in opposing sides of the fourth supporting member and each extended along the first direction, and
at each of opposing sides of the display device, a pair of first and second connecting members each coupled to both the third and fourth supporting members, the pair including:
the first connecting member including a first end rotatably connected to the third supporting member at a hinge axis thereof and a second end which is opposite to the first end and connected to the fourth supporting member at a second guide hole thereof, and
the second connecting member including a first end rotatably connected to the fourth supporting member at a hinge axis thereof and a second end which is opposite to the first end and connected to the third supporting member at a first guide hole thereof.

12. The display device of claim 11, wherein
the pair of roller members includes a first roller member slidably and rotatably coupled to the first guide holes of the third supporting member, and a second roller member slidably and rotatably coupled to the second guide holes of the fourth supporting member,
the second end of the first connecting member is connected to the fourth supporting member at the second roller member, and
the second end of the second connecting member is connected to the third supporting member at the first roller member.

13. The display device of claim 12, wherein
each of the first guide holes includes a first end which is closest to the folding area and a second end which is farthest from the folding area,
each of the second guide holes includes a first end which is closest to the folding area and a second end which is farthest from the folding area, and the display device which is unfolded respectively disposes the first and second roller members at the first ends of the first guide holes and the first ends of the second guide holes.

14. The display device of claim 13, wherein folding of the display device which is unfolded slides and rotates each of the first and second roller members at the same time respectively toward the second ends of the first guide holes and the second ends of the second guide holes.

15. A folding member comprising:
a film layer respectively corresponding to each of a folding area of a display panel and non-folding areas of the display panel which are respectively extended from opposing sides of the folding area along a first direction, the film layer being foldable together with the display panel and defining a storage space in which a fluid is disposed; and
a pair of roller members each in slidable contact with the film layer, each of the pair of roller members slidable along the first direction,
wherein
unfolding of the display panel moves each of the pair or roller members along the first direction toward the folding area, and
folding of the display device moves each of the pair of roller members along the first direction away from the folding area.

16. The folding member of claim 15, wherein moving of each of the pair of roller members along the first direction moves the fluid within the storage space along the first direction.

17. The folding member of claim 16, wherein unfolding of the folding member moves the fluid within the storage space toward an area of the film layer which corresponds to the folding area of the display panel and fills the area of the film layer with the fluid.

18. The folding member of claim 17, wherein the unfolding of the folding member defines a thickness of the film layer at the folding area which is greater than a remaining thickness of the film layer which is outside of the folding area.

19. The folding member of claim 16, wherein folding of the folding member moves the fluid within the storage space to an area of the film layer which is outside the folding area to fill the area of the film layer which is outside the folding area.

20. The folding member of claim 19, wherein the folding of the folding member defines a thickness of the film layer at the folding area which is smaller than a remaining thickness of the film layer which is outside the folding area.

* * * * *